United States Patent
McCorkendale et al.

(10) Patent No.: US 9,083,527 B1
(45) Date of Patent: Jul. 14, 2015

(54) USING MOBILE DATA TO ESTABLISH A SHARED SECRET IN SECOND-FACTOR AUTHENTICATION

(75) Inventors: Bruce McCorkendale, Manhattan Beach, CA (US); Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/601,972

(22) Filed: Aug. 31, 2012

(51) Int. Cl.
| | |
|---|---|
| H04L 29/06 | (2006.01) |
| G06F 21/00 | (2013.01) |
| H04L 9/28 | (2006.01) |
| H04L 29/08 | (2006.01) |
| G06F 17/30 | (2006.01) |
| G06F 15/16 | (2006.01) |
| H04L 9/08 | (2006.01) |

(52) U.S. Cl.
CPC .............. *H04L 9/28* (2013.01); *H04L 63/0421* (2013.01); *H04L 9/0872* (2013.01)

(58) Field of Classification Search
CPC ...... H04L 9/28; H04L 9/0872; H04L 63/0421
USPC .......... 726/6, 4, 3; 713/171, 172, 182; 380/30
See application file for complete search history.

(56) References Cited

U.S. PATENT DOCUMENTS

| | | | |
|---|---|---|---|
| 2007/0036353 A1* | 2/2007 | Reznik et al. ................... | 380/30 |
| 2010/0100936 A1* | 4/2010 | Brik et al. ......................... | 726/3 |
| 2011/0145897 A1* | 6/2011 | Tyree ............................... | 726/6 |

FOREIGN PATENT DOCUMENTS

EP    2518978 A2 * 10/2012

OTHER PUBLICATIONS

Claudio Marforio; Nikolaos Karapanos; Claudio Sorientes; Kari Kostiainen; Srdjan Capkun; "Secure enrollment and practical migration for mobile trusted execution environments"; Nov. 2013; SPSM '13: Proceedings of the Third ACM workshop on Security and privacy in smartphones & mobile devices; pp. 93-98.*

* cited by examiner

*Primary Examiner* — Andrew Nalven
*Assistant Examiner* — Courtney Fields
(74) *Attorney, Agent, or Firm* — Lowenstein Sandler LLP (57) ABSTRACT

A server computer system receives mobile device activity data from a mobile device. The server computer system verifies that the mobile device activity data matches mobile device activity data that is stored at the mobile device and generates a shared secret at the server computer system using the received mobile device activity data. The shared secret at the server computer system matches a shared secret generated at the mobile device.

13 Claims, 5 Drawing Sheets

USING MOBILE DATA TO ESTABLISH A SHARED SECRET IN SECOND-FACTOR AUTHENTICATION

TECHNICAL FIELD

The present disclosure relates to shared secrets, and more particularly, to using mobile data to establish a shared secret in second-factor authentication.

BACKGROUND

Enterprises can control user access to enterprise applications, such as web applications, by authenticating users via user credentials, such as a username and password. Enterprises may wish to provide a more secure environment by implementing strong authentication, also known as second-factor authentication, which uses a second-factor credential in addition to user credentials (e.g., username, password). A typical second-factor authentication scheme involves the provisioning of a device (the "something you have" piece of the secure authentication scheme) with a shared secret. The shared secret may be a long string, a portion of which may be hashed to create an authentication token. The authentication token may be supplied at authentication time to prove to a server that the client has the same shared secret. Traditionally, the shared secret string has been provisioned to a device during a one-time setup. The shared secret is generally created by a server and then securely delivered to the device. The static shared secret, once provisioned, usually does not change, and may be prone to discovery, for example, by an attacker.

SUMMARY

In one embodiment, a system for generating a shared secret using mobile device activity data is described. An example system may include a memory and a processing device that receives mobile device activity data from a mobile device. The system verifies that the mobile device activity data matches mobile device activity data that is stored at the mobile device and generates a shared secret at the system using the received mobile device activity data. The shared secret at the system matches a shared secret generated at the mobile device. In one implementation, the mobile device activity data is received via a secure transmission protocol.

In one implementation, the system further receives additional mobile device activity data from the mobile device and verifies that the additional mobile device activity data matches additional mobile device activity data that is stored at the mobile device. The system generates a new shared secret using the additional mobile device activity data. The new shared secret generated by the system matches a new shared secret generated at the mobile device.

In one implementation, the mobile device activity data includes any combination of mobile device location data, mobile device usage data, mobile application usage data, and/or mobile application inventory data. In one implementation, the system sends a message to the mobile device indicating criteria for the mobile device to use to generate the shared secret at the mobile device. The criteria are associated with the mobile device activity data. In one implementation, the criteria includes any combination of the mobile device activity data to use to generate the shared secret, one or more sampling algorithms to use to generate the shared secret, a length of shared secret, and/or an order of the sub-sets of mobile device activity data to use to generate the shared secret.

Further, a method for generating a shared secret is described. In one implementation, the method includes receiving mobile device activity data from a mobile device, verifying that the mobile device activity data matches mobile device activity data that is stored at the mobile device, and generating a shared secret at the system using the received mobile device activity data. In one implementation, the mobile device activity data is received via a secure transmission protocol, such as hypertext transfer protocol secure (HTTPS). The shared secret that is generated by the method matches a shared secret generated at the mobile device.

In addition, a non-transitory computer readable storage medium for generating a shared secret using mobile device activity data is described. An example non-transitory computer readable storage medium includes instructions that will cause a processing device to receive mobile device activity data from a mobile device, verify that the mobile device activity data matches mobile device activity data that is stored at the mobile device and generate a shared secret at the system using the received mobile device activity data.

BRIEF DESCRIPTION OF THE DRAWINGS

The present disclosure will be understood more fully from the detailed description given below and from the accompanying drawings of various implementations of the disclosure.

DETAILED DESCRIPTION

Described herein are a method and apparatus for generating a shared secret using mobile device activity data. In second-factor authentication, a shared secret can be associated with "something you have." The shared secret can be a string that is large enough to make identification of the secret difficult to any person or any system that does not have knowledge of the shared secret. The shared secret can be used to authenticate a user, for example, for virtual private network (VPN) access. The user may have a mobile device, such as a mobile phone, which can generate and store a shared secret. Implementations of this disclosure describe the mobile device using mobile device activity data to generate the shared secret. A server, such as an authentication server, can also generate and store a shared secret. Implementations of this disclosure describe the server securely receiving mobile device activity data from the mobile device and using the mobile device activity data to generate the shared secret. The shared secret generated by the server must match the shared secret generated by the mobile device. The shared secret is not known by other users and/or systems.

The shared secret can be used in second-factor authentication. For example, a user may request access to a VPN network and the mobile phone can perform a hash on at least a portion of the shared secret that is stored on the mobile phone to create an authorization token. The mobile phone can send the authorization token to the server. The server can perform a hash on at least a portion of the shared secret that is stored by the server to generate an authorization token. The server can determine whether the authorization token generated by the server matches the authorization token received by the mobile device.

Implementations of this disclosure allow a shared secret to be generated using dynamic data, such as mobile device activity data. Implementations also allow a shared secret to be easily changed using the dynamic data. Changing the shared secret can add another layer of protection. For example, a policy may specify that a mobile device and the server create a new shared secret once a month using mobile device activity data that has been collected for the past thirty days.

Figure 1:
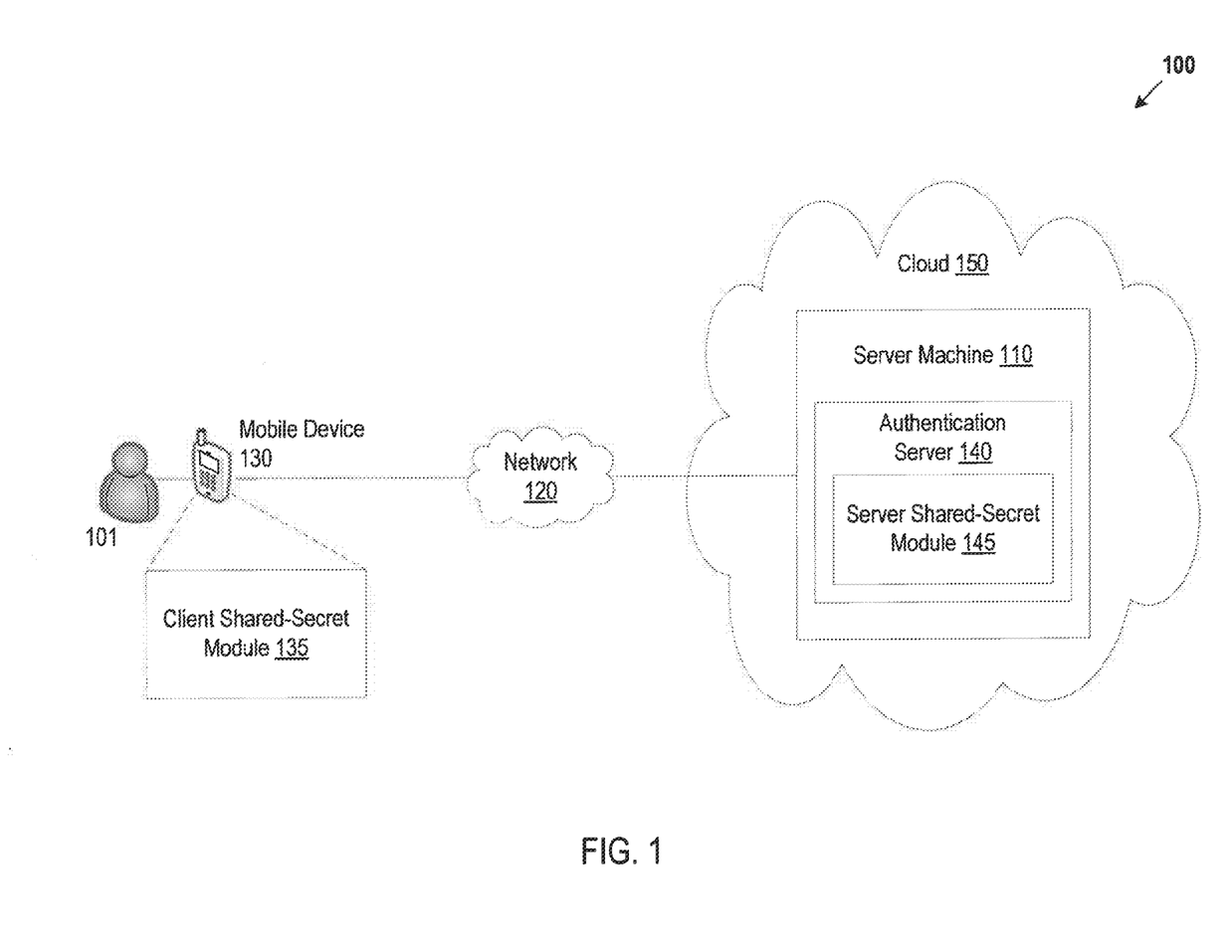
FIG. 1 illustrates example system architecture, in accordance with various implementations.

FIG. 1 is example system architecture 100 for various implementations. The system architecture 100 can include one or more mobile devices 130 and one or more server machines 110 coupled to each other via a network 120. The server machine 110 can be a cloud-based server that is hosted in a cloud 150. The cloud 150 can include any number of host machines, which can be used to execute an authorization server 140 on a server machine 110.

The network 120 may be a public network, a private network, or a combination thereof. Network 120 can include a wireless/cellular network. The wireless/cellular infrastructure may be provided by one or multiple wireless/cellular communications systems, such as a wireless fidelity (WiFi) hotspot connected with the network 120 and/or a wireless/cellular carrier system that can be implemented using various data processing equipment, communication towers, etc.

A mobile device 130, can be a portable computing device such as, and not limited to, mobile telephones, personal digital assistants (PDAs), portable media players, netbooks, laptop computers, tablet computers, portable gaming console, portable television, an electronic book reader and the like.

The server machine 110 can include one or more authentication servers 140 to provide an authentication service, such as a user authentication service that authenticates the identity of users 101 using a mobile device 130. The authentication server 140 can support second-factor authentication. The server machine 110 can include a network-accessible server-based functionality (e.g., authentication server 140) or other data processing equipment. The server machine 110 can include, and are not limited to, any data processing device, such as a desktop computer, a laptop computer, a mainframe computer, a personal digital assistant, a server computer, a handheld device or any other device configured to process data.

The authentication server 140 can include a server shared-secret module 145 to generate a shared secret, for example, for second-factor authentication of a user 101 using a mobile device 130. The server shared-secret module 145 can receive mobile device activity data from the mobile device 130 and can use the mobile device activity data to generate a shared secret. In one implementation, the mobile device activity data is securely received, for example, using a secure transmission protocol, such as hypertext transfer protocol secure (HTTPS). Implementations of the server shared-secret module 145 generating a shared secret using the mobile device activity data are described in greater detail below in conjunction with FIG. 2 and FIG. 3. Examples of mobile device activity data can include, and are not limited to, mobile device location data, mobile device usage data (e.g., battery level, CPU utilization, Wi-Fi signal level, cellular signal level, etc.), mobile application usage data, mobile application inventory data, etc.

The mobile device 130 can include a client shared-secret module 135 to collect the mobile device activity data and to send the mobile device activity data to the server shared-secret module 145, which the server shared-secret module 145 can use for generating a shared secret. The client shared-secret module 135 can generate a shared secret using the collected mobile device activity data and can store the shared secret on the mobile device 130. Implementations of the client shared-secret module 135 generating a shared secret using the mobile device activity data are described in greater detail below in conjunction with FIG. 2 and FIG. 4.

The shared secret generated by the client shared-secret module 135 should match the shared secret generated by the server shared-secret module 145. The shared secrets can be subsequently used in second-factor authentication. For example, the mobile device 130 can perform a hash on at least a portion of the shared secret stored at the mobile device 130 to generate a second-factor authentication token for VPN (virtual private network) access. The mobile device 130 can send the second-factor authentication token to the authentication server 140. The authentication server 140 can perform a hash on at least a portion of the shared secret stored at the server machine 110 to generate a second-factor authentication token and determine whether the second-factor authentication token generated by the authentication server 140 matches the authentication token received from the mobile device 130.

Figure 2:
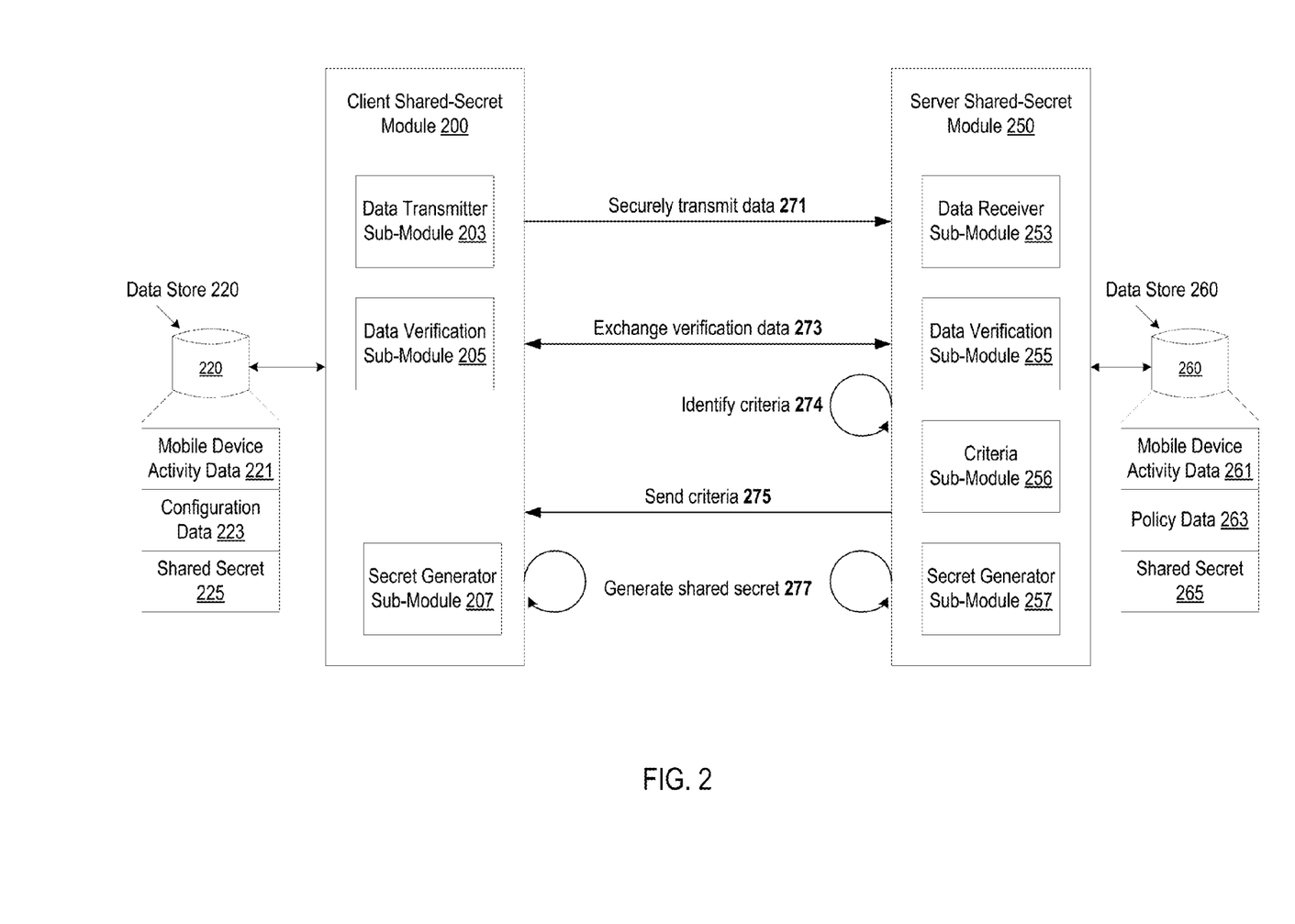
FIG. 2 is a block diagram of an implementation of a client shared-secret module and a server shared-secret module.

FIG. 2 illustrates a block diagram of one implementation of a client shared-secret module 200 and a server shared-secret module 250. The client shared-secret module 200 may correspond to a client shared-secret module 135 in a mobile device 130 of FIG. 1. The server shared-secret module 250 may correspond to a server shared-secret module 145 in a server machine 110 of FIG. 1.

The client shared-secret module 200 can include a data transmitter sub-module 203, a data verification sub-module 205, and a secret generator sub-module 207. The server shared-secret module 250 can include a data receiver sub-module 253, a data verification sub-module 255, a criteria sub-module 256, and a secret generator sub-module 257. Note that in alternative implementations, the functionality of one or more of the sub-modules can be combined or divided.

The data transmitter sub-module 203 can collect mobile device activity data 221 for the mobile device and can store the mobile device activity data 221 in a data store 220 that is coupled to the client shared-secret module 200. Examples of mobile device activity data 221 can include, and are not limited to, mobile device location data, mobile device usage data, mobile application usage data, mobile application inventory data, etc. Examples of mobile device usage data can include, and are not limited to, CPU (central processing unit) utilization, battery utilization (e.g., battery level discharge), network utilization, memory utilization, bandwidth utilization, mobile messages (e.g., short message service (SMS) text messages, multimedia messaging service (MMS) message, iMessage) sent/received, phone calls made/received, phone minutes used, Wi-Fi signal level, cellular signal level, etc.

The data transmitter sub-module 203 can collect mobile device activity data 221 from various data sources, such as, and not limited to, the mobile device operating system, the mobile device applications, the mobile device global positioning system, etc. In one implementation, the mobile device activity data is securely collected, for example, by using encryption. Implementations describing the mobile device activity data are described in greater detail below in conjunction with FIG. 3 and FIG. 4.

The data transmitter sub-module 203 can periodically and securely transmit (271) the mobile device activity data 221 to the server shared-secret module 250 over a network (e.g., network 120 in FIG. 1). The data transmitter sub-module 203 can use a secure transmission protocol (e.g., HTTPS) to transmit the mobile device activity data 221. The period for transmitting the mobile device activity data 221 can be a configurable value that is stored in configuration data 223 in the data store 220.

The data collection sub-module 253 in the server shared-secret module 250 can receive mobile device activity data from the data transmitter sub-module 203 and can store the mobile device activity data 261 in a data store 260 that is coupled to the server shared-secret module 250. In one implementation, the mobile device activity data is securely received. The mobile device activity data 221 which is sent by the data transmitter sub-module 203 may not match the mobile device activity data 261 that is stored at the server data store 260. For example, a transmission made by the data transmitter sub-module 203 may fail or may become corrupted during transmission. Each of the client shared-secret module 200 and the server shared-secret module 250 can include a data verification sub-module 205,255 to exchange (273) verification data with each other for determining whether the mobile device activity data 221 that is stored in the data store 220 at the mobile device matches the mobile device activity data 261 that is stored in the data store 260 at the server. Examples of verification data can include, and are not limited to, a hash of the data sent or received, a checksum of the data sent or received, a timestamp for the mobile device activity data 221,261 sent or received, and a serial number for the mobile device activity data 221,261 sent or received. The data verification sub-modules 205,255 can use a reliable messaging protocol, such as, as not limited to, Web Services Reliable Messaging (WS-ReliableMessaging), for verifying the integrity of the mobile device activity data 221,261. An implementation describing verifying the mobile device activity data is described in greater detail below in conjunction with FIG. 3.

The criteria sub-module 256 in the server shared-secret module 250 can identify (274) the criteria of which set of mobile device activity data 221 that should be used to generate the secret. The criteria sub-module 256 can determine the criteria from policy data 263, which corresponds to the mobile device, in the data store 260. The policy data 263 can be user-defined data, for example, from a system administrator user. Examples of criteria can include, and are not limited to, one or more sub-sets of the mobile device activity data 221,261 that should be used to generate the shared secret, one or more sampling algorithms that should be used to generate the shared secret, the parameters (e.g., length of shared secret, how to order the sub-set of data, the data sources to use) that should be used to generate the shared secret, etc. For example, the criteria may specify to use location data in the mobile device activity data 221,261 having a data source of the global positioning system in the mobile device. The criteria may also specify that a sub-set of the last 100 location data entries in the mobile device activity data 221,261 should be used, a sample of every $10^{th}$ entry in the sub-set of 100 should be used, and the length for the shared secret should be a string that concatenates every $10^{th}$ entry. The sampling interval can also be a non-linear sampling scheme. A different sampling scheme can be specified for each type of mobile device activity data 221,261. The criteria sub-module 256 can send (275) the criteria to the secret generator sub-module 207 in the client shared-secret sub-module 200.

The secret generator sub-module 207 at the mobile device can receive the criteria and can store the criteria as configuration data 223 in the data store 220. The secret generator sub-module 207 can generate (277) a shared secret using the criteria and the mobile device activity data 221 stored in the data store 220. For example, the secret generator sub-module 207 can concatenate the specified mobile activity based on the criteria. The secret generator sub-module 257 in the server shared-secret module 250 can generate (277) a shared secret using the criteria and the mobile device activity data 261 stored in the data store 260. The shared secret generated by the client shared-secret module 200 should match the shared secret generated by the server shared-secret module 250. The shared secret 225 generated by the secret generator sub-module 207 in the client shared-secret module 200 can be stored in the data store 220. The shared secret 265 generated by the secret generator sub-module 257 in the server shared-secret module 250 can be stored in the data store 260.

The shared secrets 225,265 can be strings that can be subsequently used in second-factor authentication. For example, the mobile device can perform a hash on at least a portion of the shared secret 225 to generate a second-factor authentication token, for example for VPN (virtual private network) access. The mobile device can send the second-factor authentication token to a server. The server can perform a hash on at least a portion of the shared secret 265 to generate a second-factor authentication token and determine whether the second-factor authentication token generated by the server matches the authentication token received from the mobile device. The hash function that should be used can be stored in the configuration data 223 and the policy data 263. The portion may be chosen as a function of the current time.

The data stores 220,250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
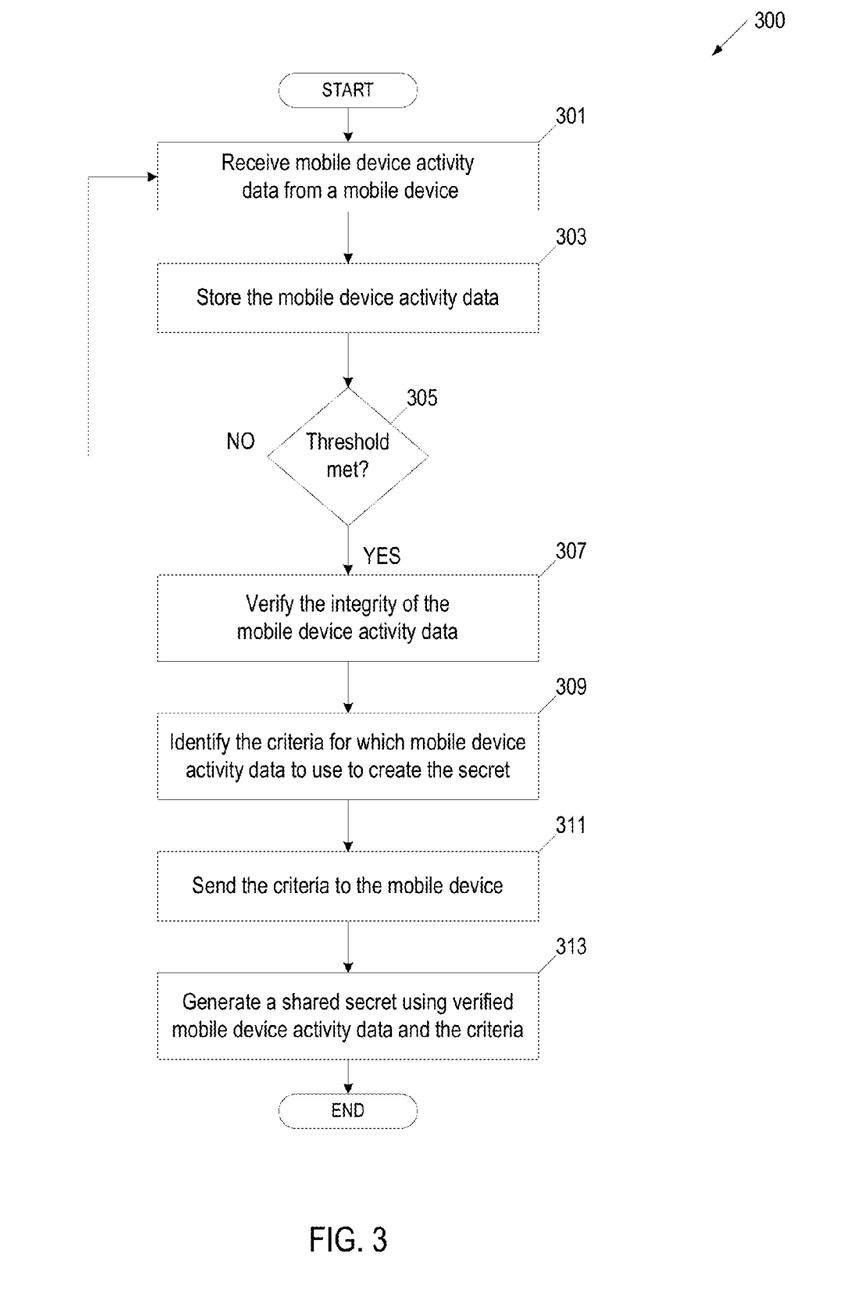
FIG. 3 is a flow diagram illustrating an implementation for a method for generating a shared secret at a server machine using mobile device activity data.

FIG. 3 is a flow diagram of an implementation of a method 300 for generating a shared secret at a server machine using mobile device activity data. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a server shared-secret module 145 in a server machine 110 of FIG. 1.

At block 301, processing logic receives mobile device activity data from a mobile device and stores the mobile device activity data in a data store that is coupled to the server shared-secret module at block 303. The mobile device activity data can be received securely. For example, the mobile device activity data may be received via a secure transmission protocol, such as, and not limited to, HTTPS. Examples of mobile device activity data can include, and are not limited to, mobile device location data, mobile device usage data, mobile application usage data, mobile application inventory data, etc. Examples of mobile device usage data can include, and are not limited to, CPU (central processing unit) utilization, battery utilization (e.g., battery level discharge), network utilization, memory utilization, bandwidth utilization, mobile messages (e.g., short message service (SMS) text messages, multimedia messaging service (MMS) message, iMessage) sent/received, phone calls made/received, phone minutes used, Wi-Fi signal level, cellular signal level, etc. The mobile device activity data can be received periodically (e.g., every 15 minutes, every hour, twice a day, once a day, etc.).

At block 305, processing logic determines whether one or more mobile device activity data thresholds have been met. Processing logic can use the threshold(s) to measure the mobile device activity data for diversity before deciding to use the mobile device activity data to generate a shared secret. The mobile device activity data thresholds can be stored in policy data that is stored in the data store. Examples of a threshold can include, and are not limited to, a minimum amount of mobile device activity data to be received, the type of mobile device activity data to be received, the data sources that should be used to collect the mobile device activity data, etc.

If a threshold is not met (block 305), processing logic returns to block 301 to continue to receive mobile device activity data. If threshold(s) are met (block 305), processing logic verifies the integrity of the mobile device activity data that is received from the mobile device at block 307. The mobile device activity data that is sent by the mobile device may not match the mobile device activity data that is received by the server. The data may be inconsistent, for example, if data becomes corrupt during transmission or if a transmission may fail. Processing logic can exchange verification data (e.g., checksum value, hash value, timestamp, serial number, etc.) for one or more sets of mobile device activity data with the mobile device. For example, processing logic may exchange hash values for location data to verify the location data received from period X to Y inclusive.

At block 309, processing logic identifies the criteria for which set of mobile device activity data to use to create the secret. Processing logic can determine the criteria from policy data, which corresponds to the mobile device, in the data store. Examples of criteria can include, and are not limited to, one or more sub-sets of the mobile device activity data that should be used to generate the shared secret, one or more sampling algorithms that should be used to generate the shared secret, the parameters (e.g., length of shared secret, how to order the sub-set of data, the data sources to use) that should be used to generate the shared secret, etc.

For example, the criteria may specify to use application usage data in the mobile device activity data having a data source of social networking applications in the mobile device. The criteria may also specify that a sub-set of the last 50 application usage data entries in the mobile device activity data should be used, a sample of every other entry in the sub-set of 50 entries should be used, and the length for the shared secret should be a string that concatenates every other entry.

At block 311, processing logic sends a message to the mobile device that can include the criteria of which mobile device activity data the mobile device should use to generate a shared secret. In one implementation, the criteria is encrypted or received via a HTTPS communication. At block 313, processing logic generates the shared secret using the mobile device activity data that has been verified and using the same criteria that was sent to the mobile device. Processing logic can exclude any unverified mobile device activity data from being used to generate the secret. The shared secret can be subsequently used in second-factor authentication. For example, the server may receive a request to verify a second-factor authentication token. The server can perform a hash on at least a portion of the shared secret to generate a second-factor authentication token and determine whether the second-factor authentication token generated by the server matches a second-factor authentication token received from a mobile device, for example, for VPN (virtual private network) access. The portion may be chosen as a function of the current time.

Figure 4:
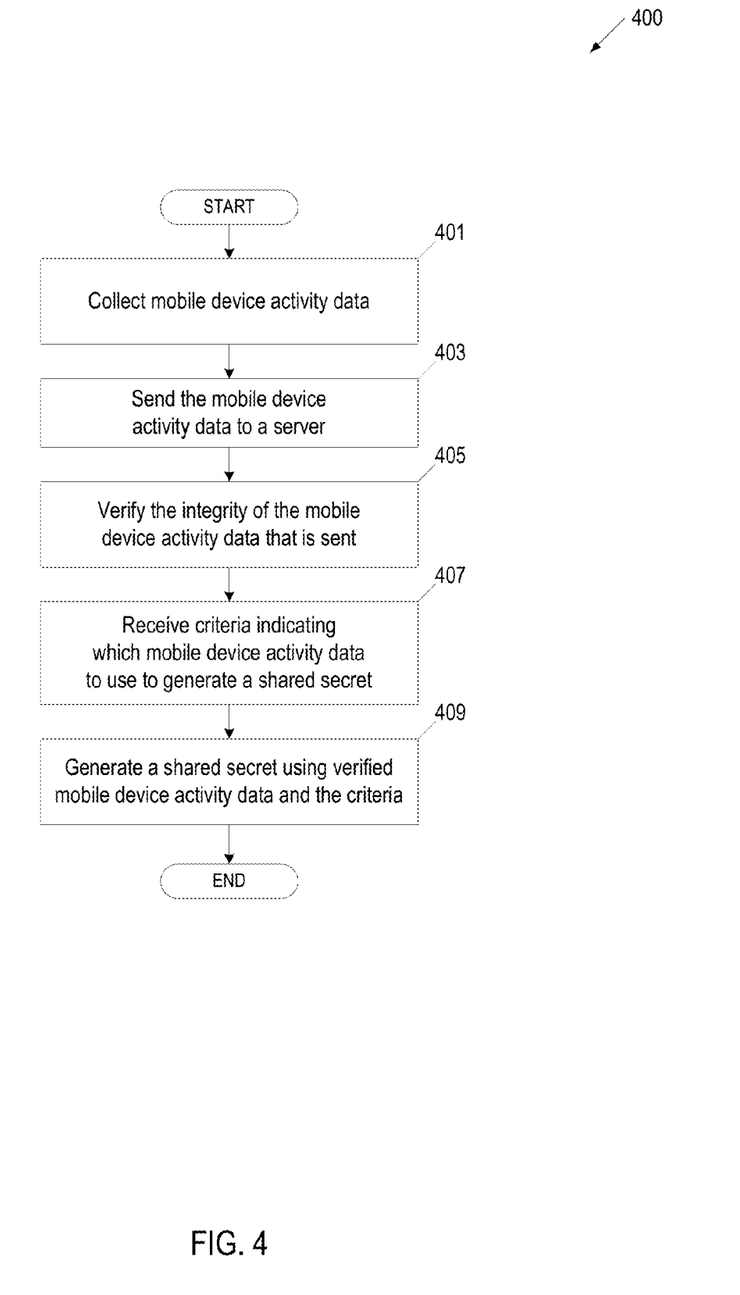
FIG. 4 is a flow diagram illustrating an implementation for a method for generating a shared secret at a mobile device using mobile device activity data.

FIG. 4 is a flow diagram of an implementation of a method 400 of generating a shared secret at a mobile device using mobile device activity data. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a client shared-secret module 135 in a mobile device 130 of FIG. 1.

At block 401, processing logic collects mobile device activity data (e.g., mobile device location data, mobile device usage data, mobile application usage data, mobile application inventory data, etc.). In one implementation, the mobile device activity data is encrypted. Examples of mobile device usage data can include, and are not limited to, CPU utilization, battery utilization (e.g., battery level discharge), network utilization, memory utilization, bandwidth utilization, mobile messages (e.g., short message service (SMS) text messages, multimedia messaging service (MMS) message, iMessage) sent/received, phone calls made/received, phone minutes used, Wi-Fi signal level, cellular signal level, etc.

Processing logic can collect the mobile device activity data from various data sources (e.g., mobile device operating system, the mobile device applications, the mobile device global positioning system (GPS), etc.). Processing logic can collect the mobile device activity data from various data sources using different periods. For example, processing logic may collect location data from the GPS every two minutes and processing logic may collect application inventory data from the mobile device operating system once a day.

At block 403, processing logic sends the mobile device activity data to a server computer system. In one implementation, the mobile device activity data is securely sent, for example, using a secure transmission protocol, such as, and not limited to, HTTPS. Processing logic can collect and send the data periodically. The period can be a configurable value that may be stored in configuration data that is stored in a data store that is coupled to the client shared-secret module. In one implementation, the period for collecting data and for sending data is different. For example, processing logic may collect mobile device activity data every five minutes and may send the mobile device activity data to the server every hour. In another implementation, the period for collecting data and for sending data is the same. For example, processing logic may collect and send mobile device activity data every 10 minutes.

At block 405, processing logic verifies the integrity of the mobile device activity data that is sent. Processing logic can use a reliable messaging protocol, such as, as not limited to, Web Services Reliable Messaging, for verifying the integrity of the mobile device activity data. In one implementation, processing logic receives a hash, a checksum, a timestamp, or a serial number for one or more sets of mobile device activity data from a server. For example, processing logic may generate a hash and or checksum for the one or more sets of mobile device activity data and determine whether the hash or checksum match the hash or checksum received from the server. Processing logic can use an algorithm that is stored in the data store to create the hash or checksum. In another example, processing logic may determine whether a timestamp, serial number, or any type of identifier that is received from the server, matches a timestamp, serial number, or any type of identifier that is stored in the data store. Processing logic may send a message to the server indicating the hash, checksum, timestamp, serial number, or other type of identifier generated by or stored by the mobile device match a hash, a checksum, a timestamp, a serial number, or other type of identifier generated by or stored at the server.

In one implementation, processing logic generates and sends a hash, a checksum, a timestamp, a serial number, or any other type of identifier for one or more sets of mobile device activity data to a server. Processing logic may receive a message from the server indicating the hash, checksum, timestamp, serial number, or other type of identifier match a hash, a checksum, a timestamp, a serial number, or other type of identifier at the server.

At block 407, processing logic receives a message from the server that can include the criteria of which mobile device activity data processing logic should use to generate a shared secret. For example, the criteria may specify to use a combination of location data and application usage data in the mobile device activity data. The criteria may specify that the data sources include the mobile device GPS and mobile applications that have been accessed in the past fourteen days. The criteria may also specify that a sub-set of the last fifty application usage data entries and a sub-set of the last one hundred location data entries in the mobile device activity data should be used. The criteria may specify a sample of every other entry in the sub-set of fifty entries should be used and a sample of every $10^{th}$ entry in the set of one hundred entries be used. The criteria may specify that the length for the shared secret should be a string that concatenates an entry from the location data with an entry from the application usage data. The criteria can specify any combination of sub-sets of the mobile device activity data, any number of sampling algorithms to use, and any combination of the parameters (e.g., length of shared secret, how to order the sub-set of data, the data sources to use, etc.) to use. At block 409, processing logic generates the shared secret using verified mobile device activity data and the criteria. Processing logic can exclude any unverified mobile device activity data from being used to generate the secret.

Figure 5:
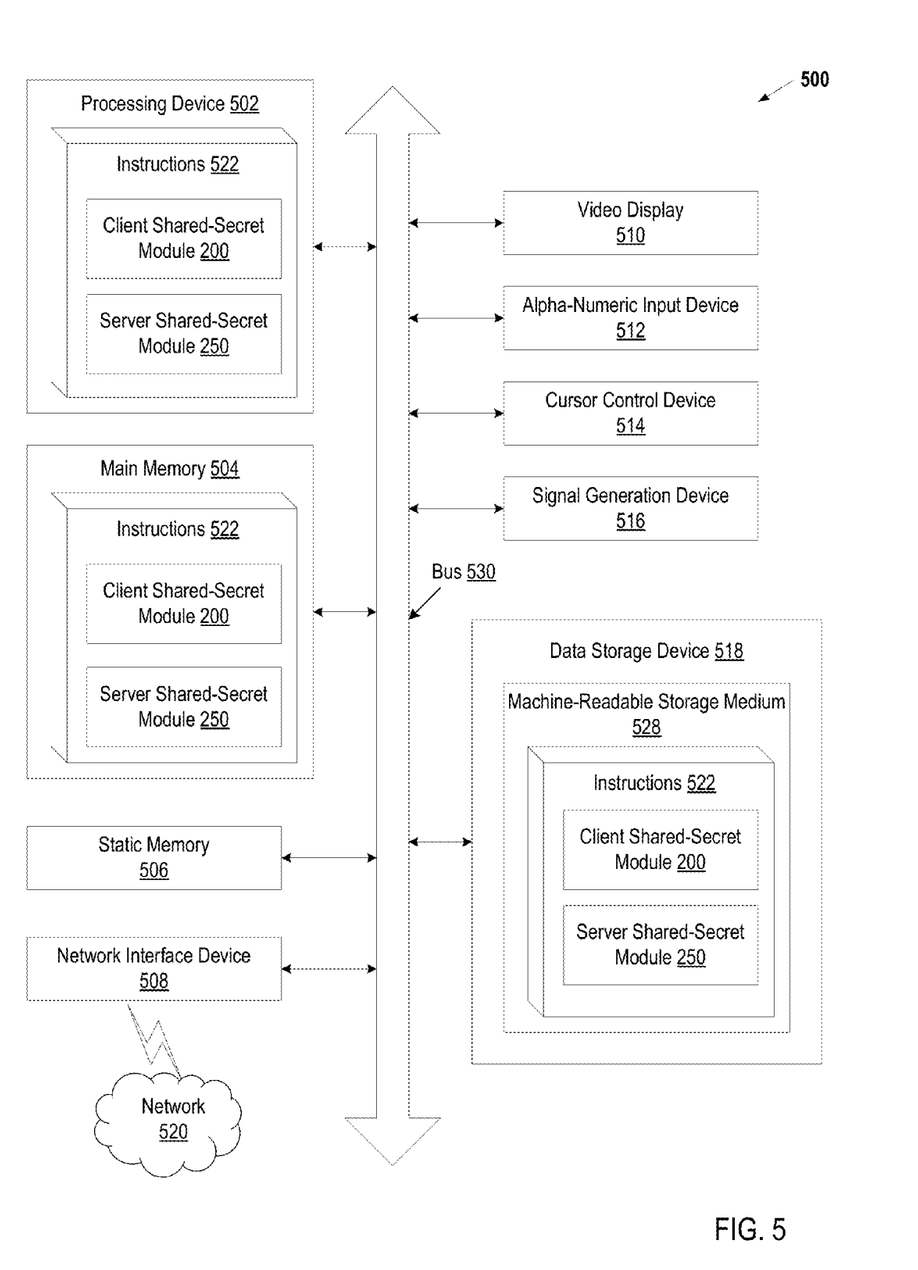
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a client shared-secret module and/or a server shared-secret module (e.g., client shared-secret module 200 of FIG. 2, server shared-secret module 250 of FIG. 2) and/or a software library containing methods that call modules in a client shared-secret module and/or a server shared-secret module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "verifying" or "generating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
receiving, by a server computer system, mobile device activity data from a mobile device;
verifying that the mobile device activity data matches mobile device activity data that is stored at the mobile device, wherein the mobile device activity data comprises mobile device location data, mobile device usage data, mobile application usage data, and mobile application inventory data;
generating a shared secret at the server computer system using the received mobile device activity data, wherein the shared secret at the server computer system matches a shared secret generated at the mobile device; and
sending a message to the mobile device indicating criteria for the mobile device to use to generate a shared secret at the mobile device, wherein the criteria comprises at least one of the mobile device activity data to use to generate the shared secret, one or more sampling algorithms to use to generate the shared secret, a length of the shared secret, or an order of the mobile device activity data to use to generate the shared secret.

2. The method of claim 1, wherein the mobile device activity data is received via a secure transmission protocol.

3. The method of claim 1, further comprising:
receiving additional mobile device activity data from the mobile device;
verifying that the additional mobile device activity data matches additional mobile device activity data that is stored at the mobile device; and
generating a new shared secret at the server computer system using the additional mobile device activity data, wherein the new shared secret at the server computer system matches a new shared secret generated at the mobile device.

4. A method comprising:
sending, by a mobile device, mobile device activity data to a server computer system, wherein the mobile device activity data comprises mobile device location data, mobile device usage data, mobile application usage data, and mobile application inventory data;
verifying that the mobile device activity data sent by the mobile device matches mobile device activity data that is received at the server computer system;
receiving a message from the server computer system indicating criteria to use to generate a shared secret at the mobile device, wherein the criteria comprises at least one of the mobile device activity data to use to generate the shared secret, one or more sampling algorithms to use to generate the shared secret, a length of the shared secret, or an order of the mobile device activity data to use to generate the shared secret; and
generating the shared secret at the mobile device using the mobile device activity data, wherein the shared secret generated at the mobile device matches a shared secret generated at the server computer system.

5. The method of claim 4, wherein the mobile device activity data is sent via a secure transmission protocol.

6. The method of claim 4, further comprising:
sending additional mobile device activity data to the server computer system;
verifying that the additional mobile device activity data sent by the mobile device matches additional mobile device activity data that is received at the server computer system; and
generating a new shared secret at the mobile device using the additional mobile device activity data, wherein the new shared secret generated at the mobile device matches a new shared secret generated at the server computer system.

7. A system comprising:
a first memory; and
a first processing device coupled with the memory to:

receive mobile device activity data from a second processing device;

verify that the mobile device activity data matches mobile device activity data that is stored in a second memory coupled to the second processing device, wherein the mobile device activity data comprises mobile device location data, mobile device usage data, mobile application usage data, and mobile application inventory data;

generate a shared secret using the received mobile device activity data, wherein the shared secret is to match a shared secret generated by the second processing device; and send a message to the second processing device indicating criteria for the second processing device to use to generate the shared secret, wherein the criteria comprises at least one of the mobile device activity data to use to generate the shared secret, one or more sampling algorithms to use to generate the shared secret, a length of the shared secret, or an order of the mobile device activity data to use to generate the shared secret.

8. The system of claim 7, wherein the mobile device activity data is received via a secure transmission protocol.

9. The system of claim 7, wherein the first processing device is further configured to:
receive additional mobile device activity data from the second processing device;
verify that the additional mobile device activity data matches additional mobile device activity data that is stored in the second memory; and
generate a new shared secret using the additional mobile device activity data, wherein the new shared secret matches a new shared secret generated by the second processing device.

10. The system of claim 7, wherein the criteria are associated with the mobile device activity data.

11. A non-transitory computer readable storage medium including instructions that, when executed by a processor device, cause the processing device to perform a method comprising:

receiving mobile device activity data from a mobile device;

verifying that the mobile device activity data matches mobile device activity data that is stored at the mobile device, wherein the mobile device activity data comprises mobile device location data, mobile device usage data, mobile application usage data, and mobile application inventory data;

generating a shared secret at a server computer system using the received mobile device activity data, wherein the shared secret at the server computer system matches a shared secret generated at the mobile device; and sending a message to the mobile device indicating criteria for the mobile device to use to generate the shared secret at the mobile device, wherein the criteria comprises at least one of the mobile device activity data to use to generate the shared secret, one or more sampling algorithms to use to generate the shared secret, a length of the shared secret, or an order of the mobile device activity data to use to generate the shared secret.

12. The non-transitory computer readable storage medium of claim 11, wherein the mobile device activity data is received via a secure transmission protocol.

13. The non-transitory computer readable storage medium of claim 11, further comprising:
receiving additional mobile device activity data from the mobile device;
verifying that the additional mobile device activity data matches additional mobile device activity data that is stored at the mobile device; and
generating a new shared secret at the server computer system using the additional mobile device activity data, wherein the new shared secret at the server computer system matches a new shared secret generated at the mobile device.

* * * * *